United States Patent
Saitou

(10) Patent No.: US 8,128,370 B2
(45) Date of Patent: Mar. 6, 2012

(54) BLADE STRUCTURE FOR TORQUE CONVERTER AND PROCESS OF PRODUCING THE SAME

(75) Inventor: Kazumi Saitou, Numazu (JP)

(73) Assignee: Jatco Ltd, Fuji-shi (JP)

( * ) Notice: Subject to any disclaimer, the term of this patent is extended or adjusted under 35 U.S.C. 154(b) by 846 days.

(21) Appl. No.: 12/179,756

(22) Filed: Jul. 25, 2008

(65) Prior Publication Data

US 2009/0041583 A1 Feb. 12, 2009

(30) Foreign Application Priority Data

Aug. 7, 2007 (JP) ................. 2007-205425

(51) Int. Cl.
*F16H 41/26* (2006.01)
*B23P 15/02* (2006.01)

(52) U.S. Cl. ................. 416/197 C; 416/182; 416/223 R

(58) Field of Classification Search .................. 416/182, 416/197 C, 223 R
See application file for complete search history.

(56) References Cited

U.S. PATENT DOCUMENTS

| | | | |
|---|---|---|---|
| 3,224,079 | A | 12/1965 | Dybvig |
| 5,996,391 | A | 12/1999 | Mizobuchi |
| 6,036,439 | A | 3/2000 | Mizobuchi et al. |
| 6,053,024 | A | 4/2000 | Yoshida |
| 6,382,916 | B1 | 5/2002 | Gomi et al. |
| 2004/0250594 | A1 | 12/2004 | Schwenk |
| 2010/0037458 | A1 | 2/2010 | Ranz et al. |

FOREIGN PATENT DOCUMENTS

| | | |
|---|---|---|
| JP | 07-004496 A | 1/1995 |
| JP | 9-42413 A | 2/1997 |
| JP | 11-006556 A | 1/1999 |

OTHER PUBLICATIONS

K. Saitou, U.S. PTO Office Action, U.S. Appl. No. 12/179,772, dated Mar. 21, 2011, 10 pages.
U.S. Appl. No. 12/179,772, filed Jul. 25, 2008, Saitou.
U.S. Appl. No. 12/179,790, filed Jul. 25, 2008, Saitou.
Kazumi Saitou, U.S. PTO Notice of Allowance and Allowability, U.S. Appl. No. 12/179,772, dated Aug. 5, 2011, 6 pages.
Kazumi Saitou, U.S. PTO Office Action, U.S. Appl. No. 12/179,790, dated Sep. 13, 2011, 8 pages.
K. Saitou, U.S. PTO Notice of Allowance, U.S. Appl. No. 12/179,790, dated Dec. 8, 2011, 8 pages.

*Primary Examiner* — Alexander Ghyka
(74) *Attorney, Agent, or Firm* — Foley & Lardner LLP

(57) ABSTRACT

A blade structure for a torque converter is produced as follows. A flat sheet is stamped into a shape including: a holding section; an inner connecting section located around the holding section, and held by the holding section; an outer connecting section located around the inner connecting section; and a plurality of blades connected between the inner connecting section and the outer connecting section. Then, the blades are bended into a curved shape between the inner connecting section and the outer connecting section. Then, the blades are angled by a predetermined angle with respect to the inner connecting section and the outer connecting section. Then, the holding section is displaced with respect to the inner connecting section perpendicularly of the sheet so as to shrink the sheet toward the holding section and shrink spaces between the blades. Then, the displaced holding section is removed from the sheet.

12 Claims, 14 Drawing Sheets

BLADE STRUCTURE FOR TORQUE CONVERTER AND PROCESS OF PRODUCING THE SAME

BACKGROUND OF THE INVENTION

The present invention relates generally to torque converters for transmitting power through the use of hydraulic fluid, and more particularly to a blade structure for a torque converter and a process of producing the same.

Japanese Patent Application Publication No. 9-042413 discloses a blade member for a torque converter and a process of forming the same. This blade member is formed with a plurality of blades by processing a single steel sheet, and adapted to be attached to a shell of a pump impeller or turbine runner. This is intended for allowing the blades to be attached to the shell simultaneously, and thereby reducing the time needed to attach the blades.

SUMMARY OF THE INVENTION

The blade member of Japanese Patent Application Publication No. 9-042413 is formed from a rectangular steel sheet. During the formation, the shape of the steel sheet is altered into the shape of a sector by suitably folding both lateral frames of the steel sheet. For each blade, a folded portion of one lateral frame is set longer than a folded portion of the other lateral frame. This process of folding is intricate, and accordingly, is carried out for each and every blade by a computer-controlled robot. Therefore, it may take much time to complete the formation of the blade member.

In view of the foregoing, it is desirable to provide a blade structure for a torque converter which can be easily and quickly produced, and a process for easily and quickly producing a blade structure for a torque converter.

According to one aspect of the present invention, there is provided a blade structure for a torque converter which is produced according to a process comprising: stamping a flat sheet into a shape including: a holding section; an inner connecting section located around the holding section, and held by the holding section; an outer connecting section located around the inner connecting section; and a plurality of blades connected between the inner connecting section and the outer connecting section; bending the blades into a curved shape between the inner connecting section and the outer connecting section; angling the blades by a predetermined angle with respect to the inner connecting section and the outer connecting section; displacing the holding section with respect to the inner connecting section perpendicularly of the sheet so as to shrink the sheet toward the holding section and shrink spaces between the blades; and removing the displaced holding section from the sheet.

According to another aspect of the present invention, there is provided a blade structure for a torque converter which is produced according to a process comprising: stamping a flat sheet into a shape including: a holding section; an inner connecting section located around the holding section, and held by the holding section; an outer connecting section located around the inner connecting section; a plurality of blades connected between the inner connecting section and the outer connecting section; and a plurality of core elements projecting from respective ones of the blades; angling the core elements by a first predetermined angle with respect to respective ones of the blades; bending the blades into a curved shape between the inner connecting section and the outer connecting section; angling the blades by a second predetermined angle with respect to the inner connecting section and the outer connecting section; displacing the holding section with respect to the inner connecting section perpendicularly of the sheet so as to shrink the sheet toward the holding section, shrink spaces between the blades and connect the core elements to respective two adjacent ones of the core elements; and removing the displaced holding section from the sheet.

According to a further aspect of the present invention, there is provided a process of producing a blade structure for a torque converter, the process comprising: stamping a flat sheet into a shape including: a holding section; an inner connecting section located around the holding section, and held by the holding section; an outer connecting section located around the inner connecting section; and a plurality of blades connected between the inner connecting section and the outer connecting section; bending the blades into a curved shape between the inner connecting section and the outer connecting section; angling the blades by a predetermined angle with respect to the inner connecting section and the outer connecting section; displacing the holding section with respect to the inner connecting section perpendicularly of the sheet so as to shrink the sheet toward the holding section and shrink spaces between the blades; and removing the displaced holding section from the sheet.

According to a still further aspect of the present invention, there is provided a process of producing a blade structure for a torque converter, the process comprising: stamping a flat sheet into a shape including: a holding section; an inner connecting section located around the holding section, and held by the holding section; an outer connecting section located around the inner connecting section; a plurality of blades connected between the inner connecting section and the outer connecting section; and a plurality of core elements projecting from respective ones of the blades; angling the core elements by a first predetermined angle with respect to respective ones of the blades; bending the blades into a curved shape between the inner connecting section and the outer connecting section; angling the blades by a second predetermined angle with respect to the inner connecting section and the outer connecting section; displacing the holding section with respect to the inner connecting section perpendicularly of the sheet so as to shrink the sheet toward the holding section, shrink spaces between the blades and connect the core elements to respective two adjacent ones of the core elements; and removing the displaced holding section from the sheet.

DETAILED DESCRIPTION OF THE INVENTION

Figure 1:
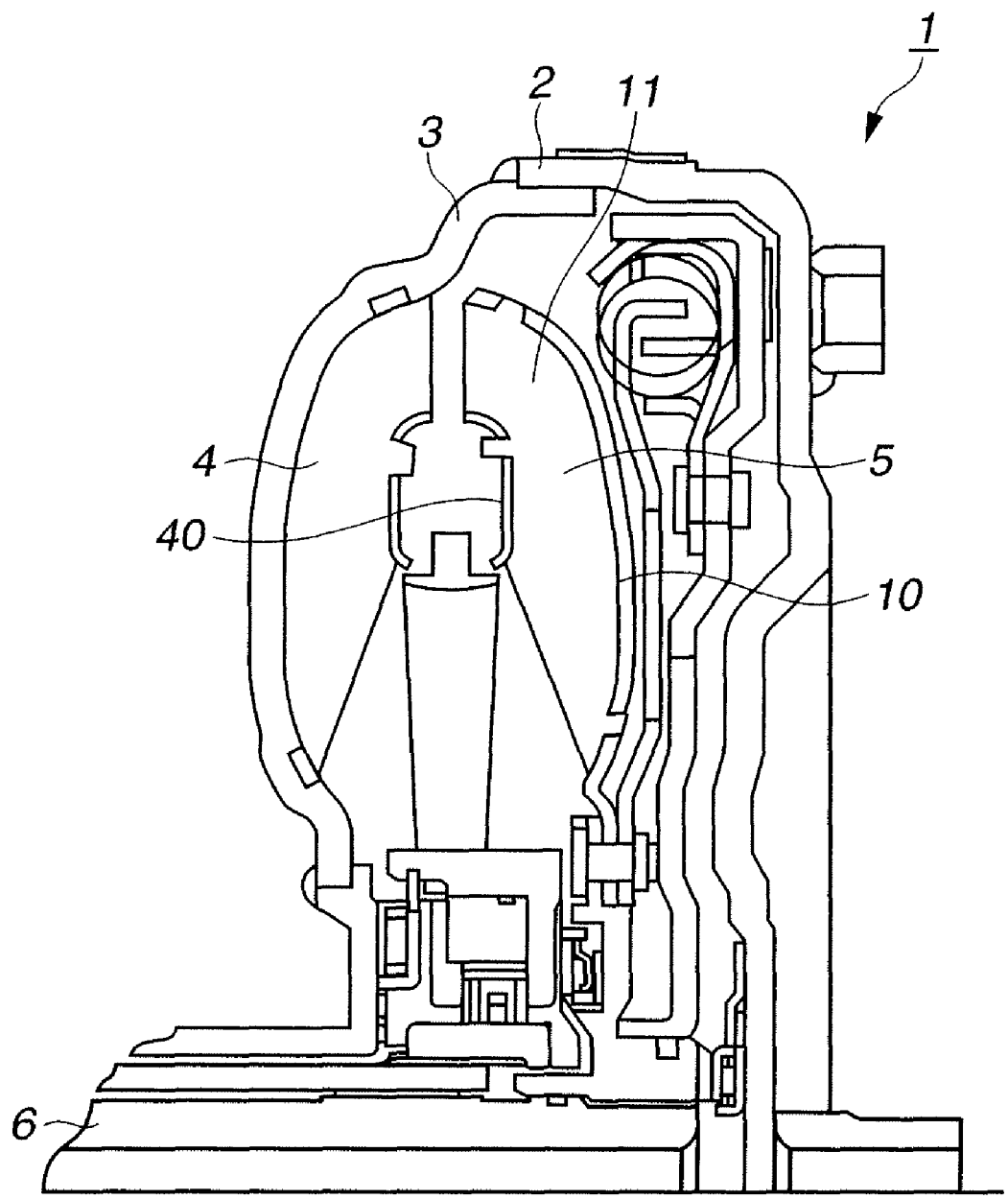
FIG. 1 is a schematic diagram showing a torque converter including a turbine runner having a blade structure according to a first embodiment of the present invention.

The following describes a torque converter including a turbine runner having a blade structure according to a first embodiment of the present invention with reference to FIGS. 1 to 8C. FIG. 1 schematically shows a torque converter 1. Torque converter 1 serves for hydraulic coupling between an engine not shown and an automatic transmission not shown in an automotive vehicle not shown.

As shown in FIG. 1, torque converter 1 includes a front cover 2, a rear cover 3, a pump impeller 4, a turbine runner 5, and an output shaft 6. Front cover 2 is attached to the engine for receiving rotation from the engine. Rear cover 3 is fixedly coupled to front cover 2 for rotation therewith. Pump impeller 4 is fixedly mounted to an inner wall of rear cover 3 for rotation therewith. Turbine runner 5 is disposed in a space defined between front cover 2 and rear cover 3, facing the pump impeller 4. Output shaft 6 is attached to the automatic transmission for transmitting rotation from turbine runner 5 to the automatic transmission.

Turbine runner 5 includes a substantially annular turbine shell 10, and a blade structure 11 joined with turbine shell 10. Blade structure 11 is provided with a core section 40 for supporting the blade structure 11, allowing an operating fluid to flow suitably in turbine shell 10, and thereby raising the efficiency of the hydraulic coupling.

Figure 2A:
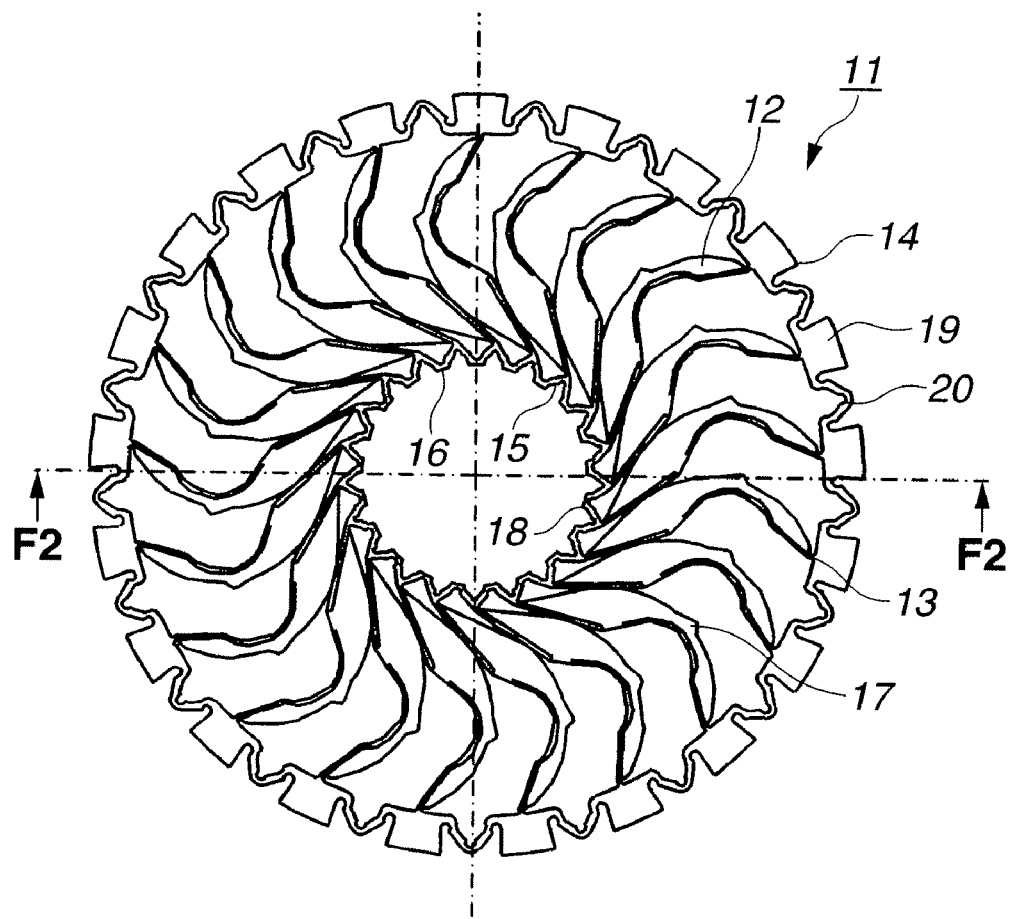
FIG. 2A is a plan view of the blade structure according to the first embodiment, showing a side facing a pump impeller of the torque converter of FIG. 1.
Figure 2B:
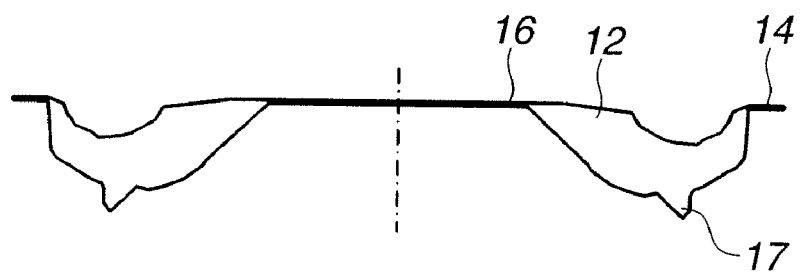
FIG. 2B is a sectional view of the blade structure, taken along the line F2-F2 shown in FIG. 2A.

FIGS. 2A and 2B show blade structure 11 in detail. Blade structure 11 includes a plurality of blades 12, an annular first connecting section (outer connecting section) 14, and an annular second connecting section (inner connecting section) 16. First connecting section 14 is located around second connecting section 16. Blades 12 are arranged and connected between first connecting section 14 and second connecting section 16, circumferentially at predetermined intervals, and adapted to be mounted in the annular space of turbine shell 10. First connecting section 14 is adapted to be joined with the inner wall of turbine shell 10, and connected to blades 12 through respective first bridging portions 13. Second connecting section 16 is adapted to be joined with the inner wall of turbine shell 10, and connected to blades 12 through respective second bridging portions 15. Blade structure 11 is formed from a single metal plate, as described in detail below.

First connecting section 14 includes a plurality of flat rectangular base portions 19, and a plurality of first adjusting portions 20. Each base portion 19 is connected to the respective blade 12 through the respective first bridging portion 13. Each first adjusting portion 20 is L-shaped as viewed in FIG. 2A, and connected between two adjacent base portions 19. Each first adjusting portion 20 is more deformable than base portion 19, because first adjusting portion 20 has a smaller cross section than base portion 19. As described in detail below, during a process of producing or forming the blade structure 11, each distance between two adjacent blades 12 (between two adjacent first bridging portions 13) and the outer diameter of blade structure 11 are adjusted or shrunk by deforming the first adjusting portions 20. Each first adjusting portion 20 in this example is open inwardly in a radial direction of blade structure 11, and has an apex projecting outwardly in the radial direction, as viewed in FIG. 2A.

Second connecting section 16 includes a plurality of second adjusting portions 18. Each second adjusting portion 18 is L-shaped as viewed in FIG. 2A, and connected between two adjacent ones of second bridging portions 15. Second adjusting portions 18 are more deformable like first adjusting portions 20. As described in detail below, during the process of forming the blade structure 11, each distance between two adjacent blades 12 (between two adjacent second bridging portions 15) and the inner diameter of blade structure 11 are adjusted or shrunk by deforming the second adjusting portions 18. Each second adjusting portion 18 in this example is open outwardly in a radial direction of blade structure 11, and has an apex projecting inwardly in the radial direction, as viewed in FIG. 2A.

Each blade 12 includes a lug 17 adapted to be fit in a recess formed in the inner wall of turbine shell 10. Each blade 12 is formed or curved, and fixedly attached to turbine shell 10 at a predetermined angle, in such a manner to allow the operating fluid to suitably flow in torque converter 1. When lug 17 is fit in the recess of turbine shell 10, each blade 12 is positioned and held in predetermined radial and circumferential positions. Blades 12 are thus arranged circumferentially at predetermined intervals. In this way, lugs 17 serve to position the blades 12 with respect to turbine shell 10.

Blade structure 11 is fixedly mounted to turbine shell 10 by welding the first and second connecting sections 14, 16 to turbine shell 10, and brazing the blades 12, positioned by means of lugs 17, to turbine shell 10.

The first and second connecting sections 14, 16 may be fixed to turbine shell 10 by another method, and blades 12 may be fixed to turbine shell 10 by another method, as long as torque converter 1 can achieve a desired level of performance.

As described above, blades 12 are formed integrally with each other in blade structure 11. This allows the blades 12 to be attached to turbine shell 10 simultaneously, and easily positioned relative to the respective recesses of turbine shell 10 while attached to turbine shell 10.

The following describes a process of producing or forming the blade structure 11 with reference to FIGS. 3 to 8C.

Figure 3:
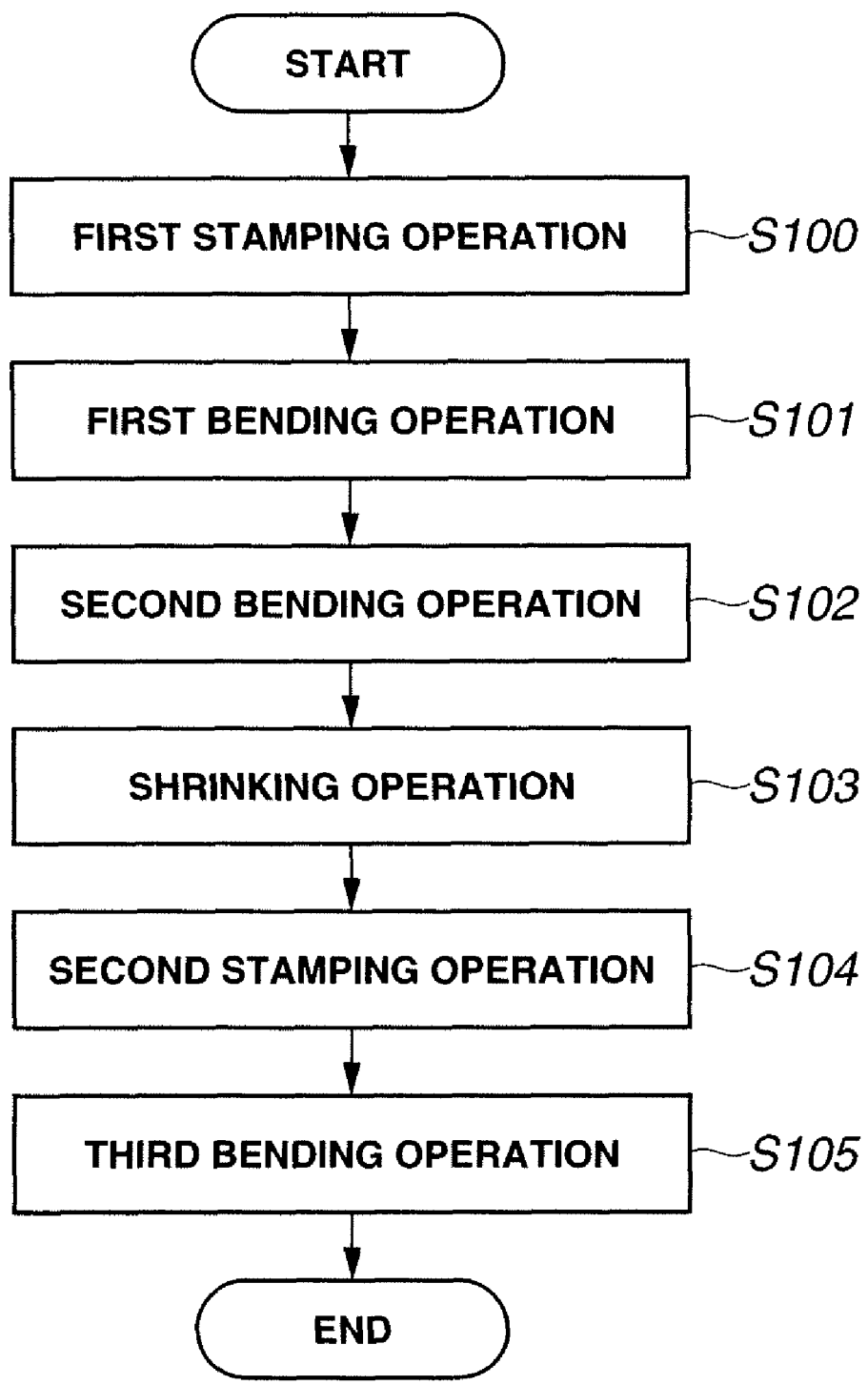
FIG. 3 is a flow chart showing a process of producing the blade structure according to the first embodiment.

According to the flow chart of FIG. 3, first, at Step S100, a first stamping operation is performed. In this operation, a single flat thin metal plate or sheet is stamped by a stamping press into a first form of blade structure 11 which is a flat plate where first connecting section 14, second connecting section 16, and blades 12 are defined, as shown in FIGS. 4A and 4B.

Figures 4A, 4B:
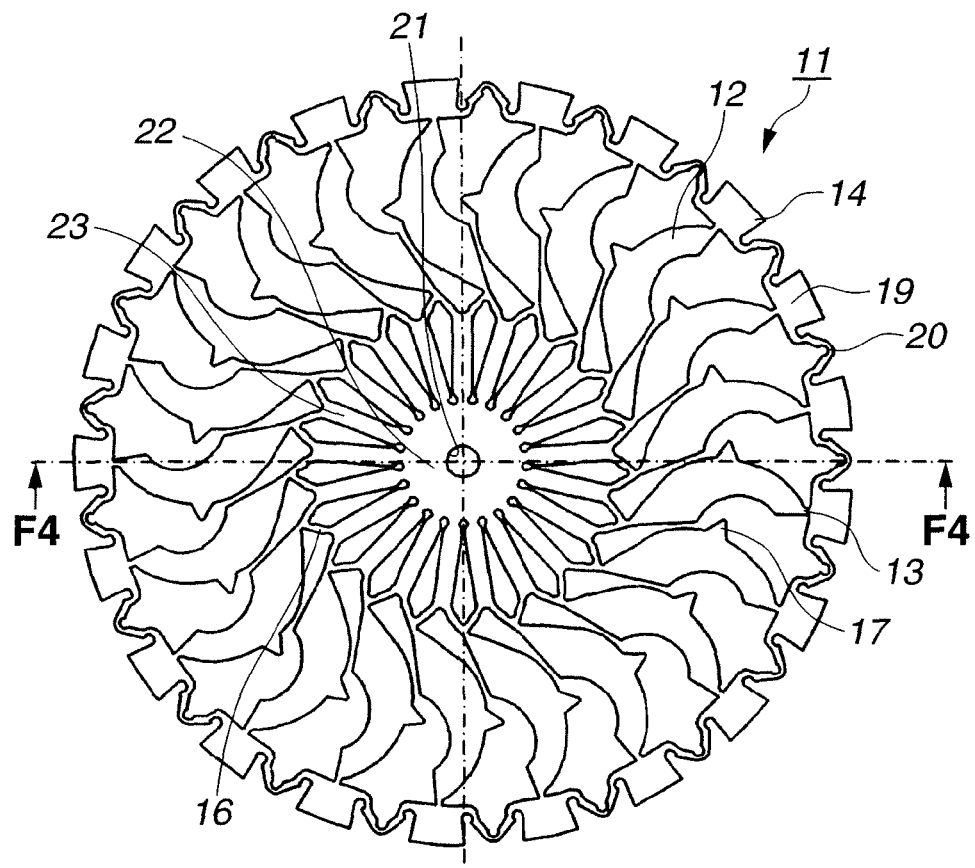
FIG. 4A is a plan view of a first form of the blade structure according to the first embodiment in the process of FIG. 3.
FIG. 4B is a sectional view of the first form of the blade structure, taken along the line F4-F4 shown in FIG. 4A.

As shown in FIG. 4A, the first form includes a central portion 22 located at the center of second connecting section 16. Central portion 22 is in the form of an annular ring which defines an opening 21 at the center. A plurality of radial bridging portions 23 are arranged circumferentially around the central portion 22. Each radial bridging portion 23 has one end connected to central portion 22 and another end connected to second connecting section 16.

Central portion 22 and radial bridging portions 23 serve as a holding section to support or hold the second connecting section 16, and also allow the blade structure 11 to shrink into a desired form during a shrinking operation described in detail below. Second connecting section 16 is thus located around the holding section.

Opening 21 is adapted to be fit over a positioning pin formed in each of molds against which blade structure 11 is pressed during the following operations, and serves to suitably position the blade structure 11 relative to each of the molds during the following operations.

Radial bridging portions 23 are arranged circumferentially at intervals of a predetermined clearance around central portion 22. As described in detail below, during the shrinking operation, the radial bridging portions 23 are deformed so as to reduce the clearances, and to shrink the blade structure 11 into the desired form. Central portion 22 serves to support the radial bridging portions 23.

Figure 5A:
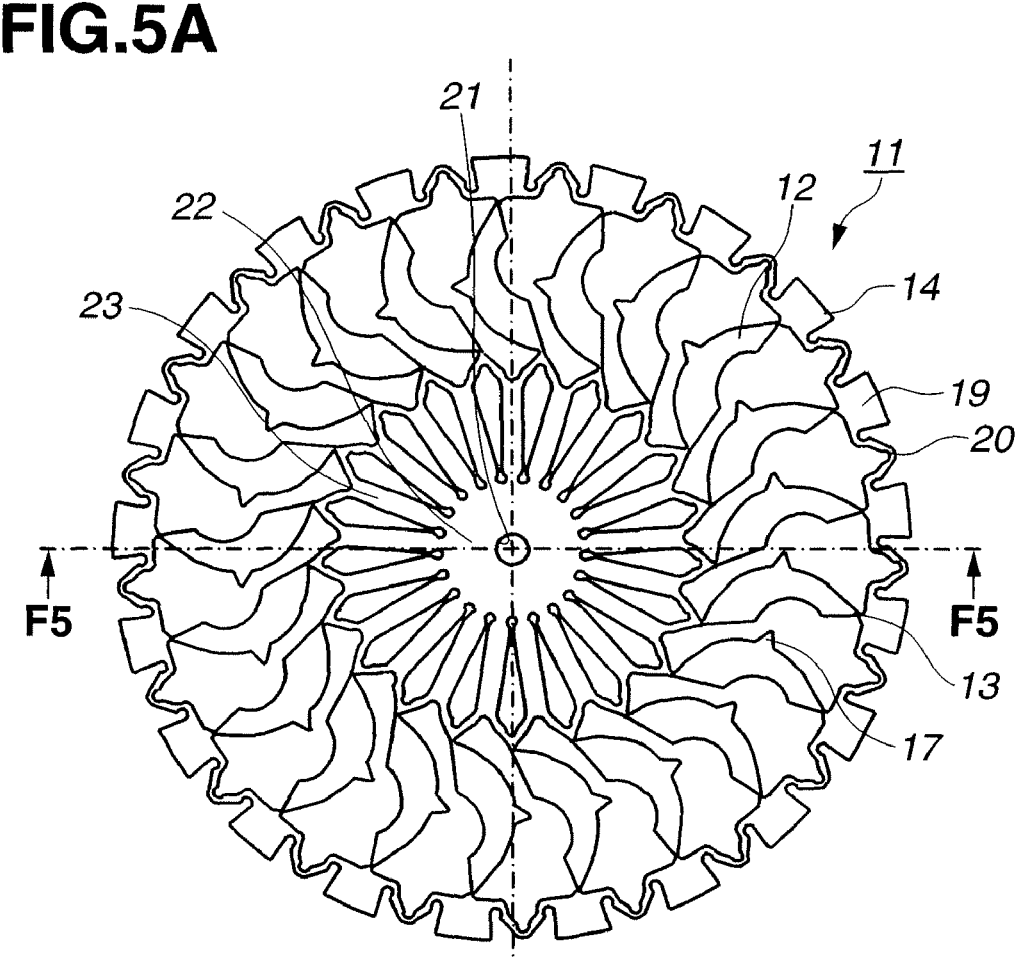
FIG. 5A is a plan view of a second form of the blade structure according to the first embodiment in the process of FIG. 3.
Figure 5B:
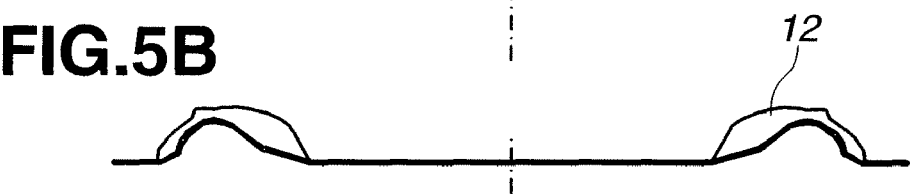
FIG. 5B is a sectional view of the second form of the blade structure, taken along the line F5-F5 shown in FIG. 5A.

At Step S101, a first bending operation is performed. In this operation, blades 12 are pressed against a mold, and thereby, are bended into predetermined shapes as shown in FIGS. 5A and 5B. This operation defines a substantially final shape of each blade 12 when blade structure 11 is attached to turbine shell 10.

During the first bending operation, each blade 12 is bended into a curved shape between first and second connecting sections 14, 16, and projected upwardly from a base plane of blade structure 11, as shown in FIG. 5B.

Figure 6A:
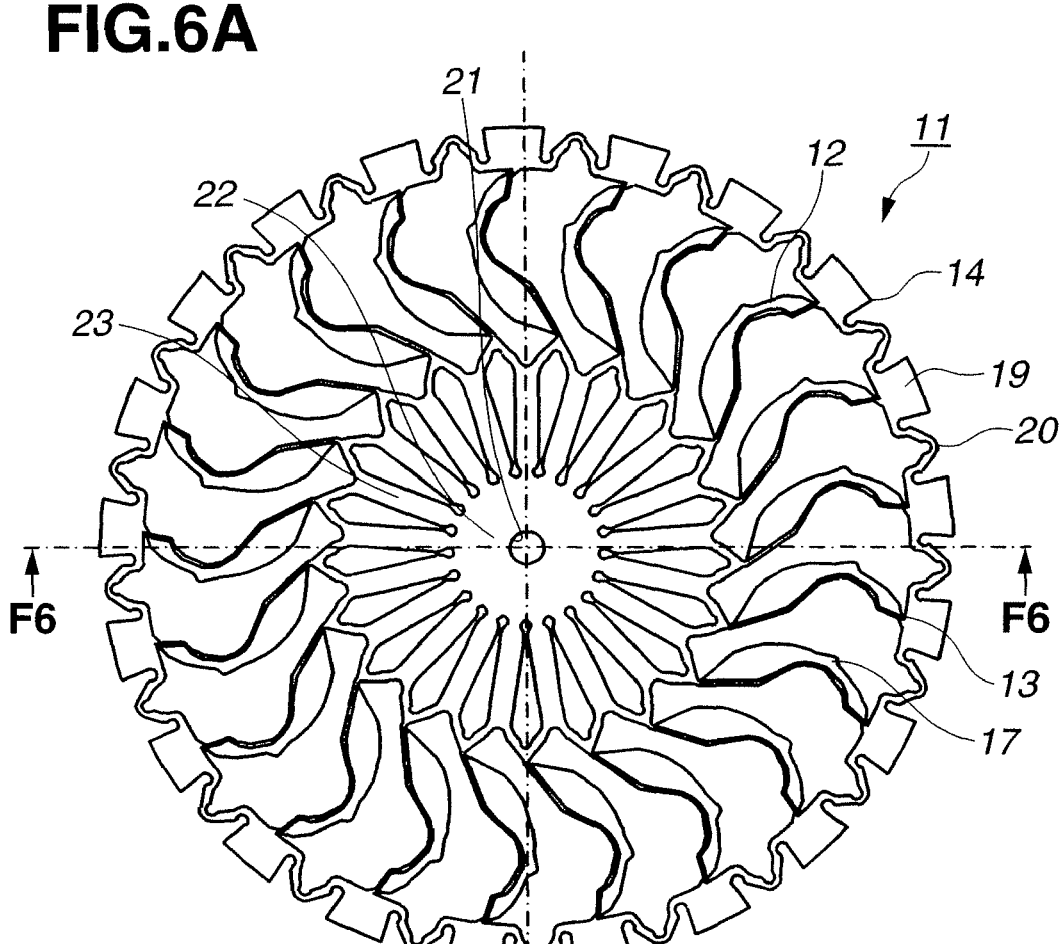
FIG. 6A is a plan view of a third form of the blade structure according to the first embodiment in the process of FIG. 3.
Figure 6B:
FIG. 6B is a sectional view of the third form of the blade structure, taken along the line F6-F6 shown in FIG. 6A.

At Step S102, a second bending operation is performed. In this operation, blade structure 11 is pressed against a mold so as to rotate each curved blade 12 with respect to first connecting section 14 and second connecting section 16 as shown in FIGS. 6A and 6B. Blades 12 are thus angled by a predetermined angle with respect to first and second connecting sections 14, 16. This operation defines a final angle of each blade 12 relative to turbine shell 10 when blade structure 11 is attached to turbine shell 10.

Figure 7A:
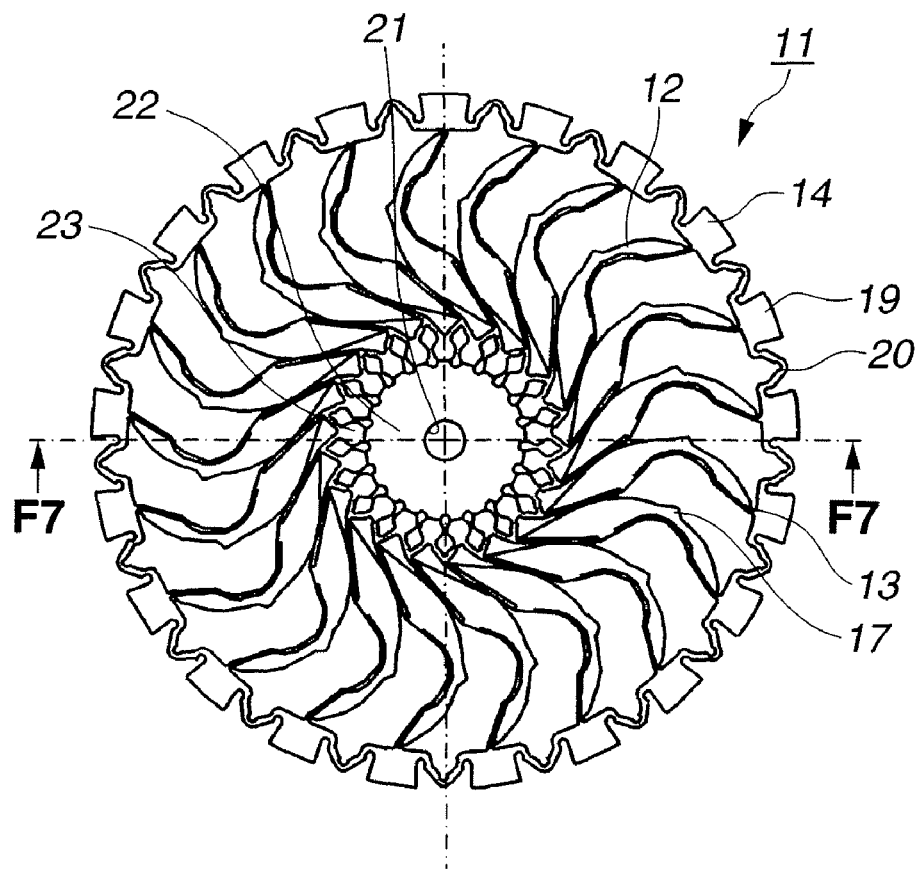
FIG. 7A is a plan view of a fourth form of the blade structure according to the first embodiment in the process of FIG. 3.
Figure 7B:
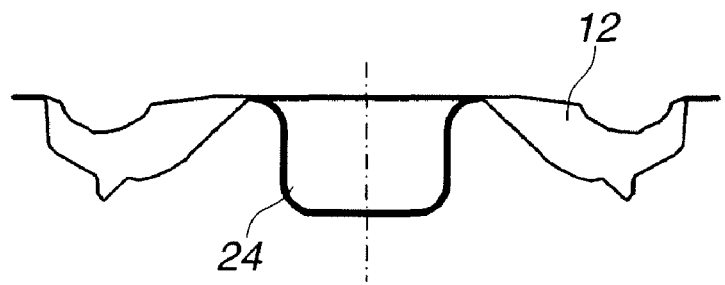
FIG. 7B is a sectional view of the fourth form of the blade structure, taken along the line F7-F7 shown in FIG. 7A.

At Step S103, the shrinking operation is performed. In this operation, blade structure 11 is pressed against a mold so that radial bridging portions 23 are deformed to extend downwardly from the base plane of blade structure 11. The holding section is thus displaced with respect to second connecting section 16 perpendicularly of the sheet, i.e. perpendicularly of the base plane of blade structure 11. This creates a projection 24 as shown in FIG. 7B.

The deformation of radial bridging portions 23 causes the blade structure 11 to shrink circumferentially and radially toward the holding section, and shrinks spaces between blades 12. In this shrinking operation, the outer diameter of blade structure 11 is set to a desired value, and each distance between two adjacent blades 12 is reduced and set to a desired value. In first connecting section 14, the first adjusting portions 20 are deformed or shrunk, whereas base portions 19 are not deformed. Also, in second connecting section 16, the second adjusting portions 18 are deformed or shrunk.

As described above, in the shrinking operation, each clearance between two adjacent radial bridging portions 23 is shrunk. This clearance may be set so that the outer diameter of blade structure 11 and the distance between two adjacent blades 12 may be suitably adjusted.

Figure 8A:
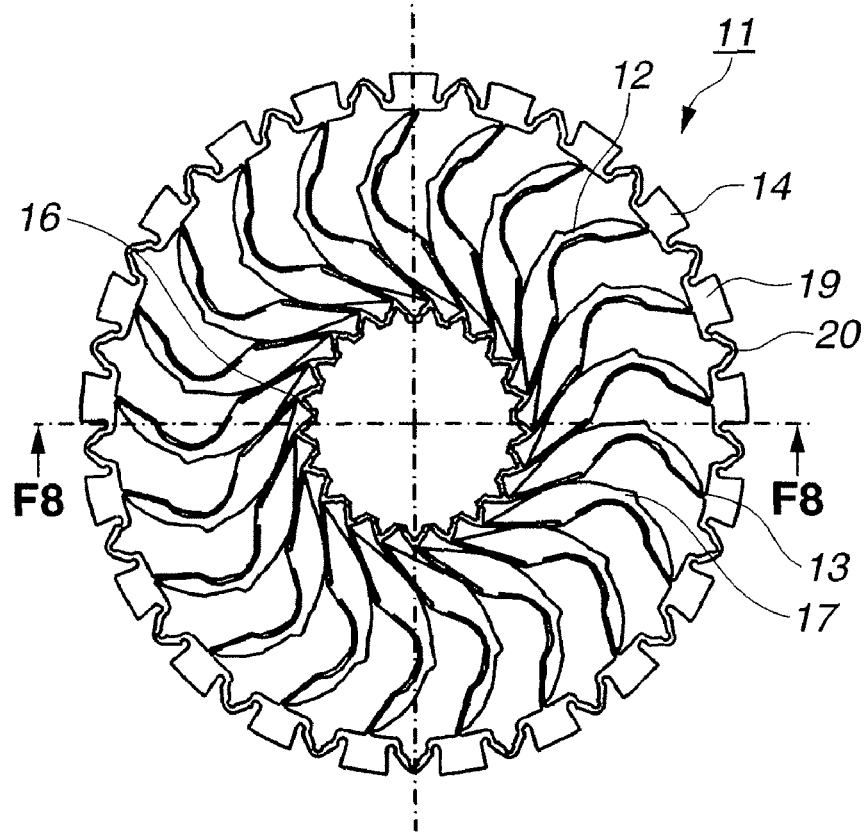
FIG. 8A is a plan view of a fifth form of the blade structure according to the first embodiment in the process of FIG. 3.
Figure 8B:
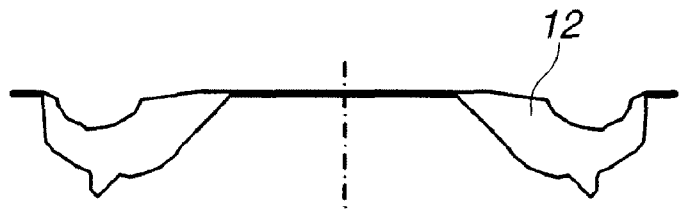
FIG. 8B is a sectional view of the fifth form of the blade structure, taken along the line F8-F8 shown in FIG. 8A.
Figure 8C:
FIG. 8C is a sectional view of a projection cut away from the fourth form of the blade structure, taken along the line F8-F8 shown in FIG. 8A.

At Step S104, a second stamping operation is performed. In this operation, the projection 24 (or the holding section), which is created through the shrinking operation at Step S103, is cut away or removed from blade structure 11 by pressing or the like. The annular second connecting section 16 is left in blade structure 11, as shown in FIGS. 8A, 8B and 8C.

The removal of projection 24 with radial bridging portions 23 forms an opening inside the second connecting section 16 in blade structure 11.

At Step S105, a third bending operation is performed. In this operation, the blade structure 11 is pressed so as to allow first connecting section 14 and second connecting section 16 to be adapted to be fit on the inclined inner wall of turbine shell 10. Blade structure 11 is thus completed. Then, the blade structure 11 is attached to turbine shell 10.

The thus-formed blade structure 11 is positioned with respect to turbine shell 10 by swaging the lugs 17 into the recesses of turbine shell 10, and attached to turbine shell 10 by brazing or welding.

In this way, blade structure 11, which is adapted to be easily mounted to turbine shell 10, is formed from a single flat thin metal sheet.

The following describes advantageous effects produced by the first embodiment.

The fact that the blades 12 are formed integrally with each other in blade structure 11 where each blade 12 is connected to first connecting section 14 through first bridging portion 13 and connected to second connecting section 16 through second bridging portion 15, allows the plurality of blades 12 to be attached to turbine shell 10 simultaneously in a short time. While blade structure 11 is attached to turbine shell 10, the blades 12 can be easily positioned at the respective recesses formed in turbine shell 10.

The fact that the first connecting section 14 includes base portions 19 and first adjusting portions 20, allows base portions 19 to raise the strength of blade structure 11, and allows first adjusting portions 20 to adjust each distance between two adjacent blades 12 and the outer diameter of blade structure 11.

The fact that each blade 12 includes lug 17 adapted to be fit in the recess formed in turbine shell 10, allows blade 12 to be suitably positioned relative to turbine shell 10 by allowing the lug 17 to be fit in the recess, while blade structure 11 is attached to turbine shell 10.

The provision of central portion 22 and radial bridging portions 23 radially inside the second connecting section 16, allows the second adjusting portions 18 to be deformed so as to shrink the outer diameter of blade structure 11 and reduce each distance between two adjacent blades 12 during the shrinking operation. Each distance between two adjacent blades 12 can be adjusted by adjusting each clearance between two adjacent radial bridging portions 23.

The first and second connecting sections 14, 16 adapted to be inclined and fit on the inner wall of turbine shell 10, allow the blade structure 11 to be easily attached to turbine shell 10.

During the shrinking operation, the blade structure 11 can be shrunk radially and circumferentially so as to suitably adjust the outer diameter of blade structure 11 and each distance between two adjacent blades 12, by the single step of pressing for deforming the radial bridging portions 23 downwardly from the base plane of blade structure 11.

In this embodiment, in first connecting section 14, each first bridging portion 13 is located at a circumferentially substantially central point of base portion 19, as shown in FIG. 4A. However, each first bridging portion 13 may be offset from the circumferentially central point of base portion 19. For example, each first bridging portion 13 may be offset from the circumferentially central point of base portion 19 in a direction opposite to a direction in which each blade 12 is curved to project. That is, each first bridging portion 13 may be offset in the clockwise direction as viewed in FIG. 4A. This results in that when each first adjusting portion 20 is deformed in the shrinking operation, then the angle of each blade 12 with respect to the radial direction of blade structure 11 is offset or inclined in the counterclockwise direction as viewed in FIG. 4A.

Similarly, in second connecting section 16, each second bridging portion 15 may be offset from a circumferentially substantially central point of second adjusting portion 18. This produces similar effects as in the case of first bridging portion 13.

The following describes a blade structure for a torque converter according to a second embodiment of the present invention. The second embodiment is created by modifying the first embodiment as follows. In this embodiment, the core section 40 is formed integrally with blade structure 11.

The following describes a process of producing or forming the blade structure 11 according to the second embodiment with reference to FIGS. 9 to 14.

Figure 9:
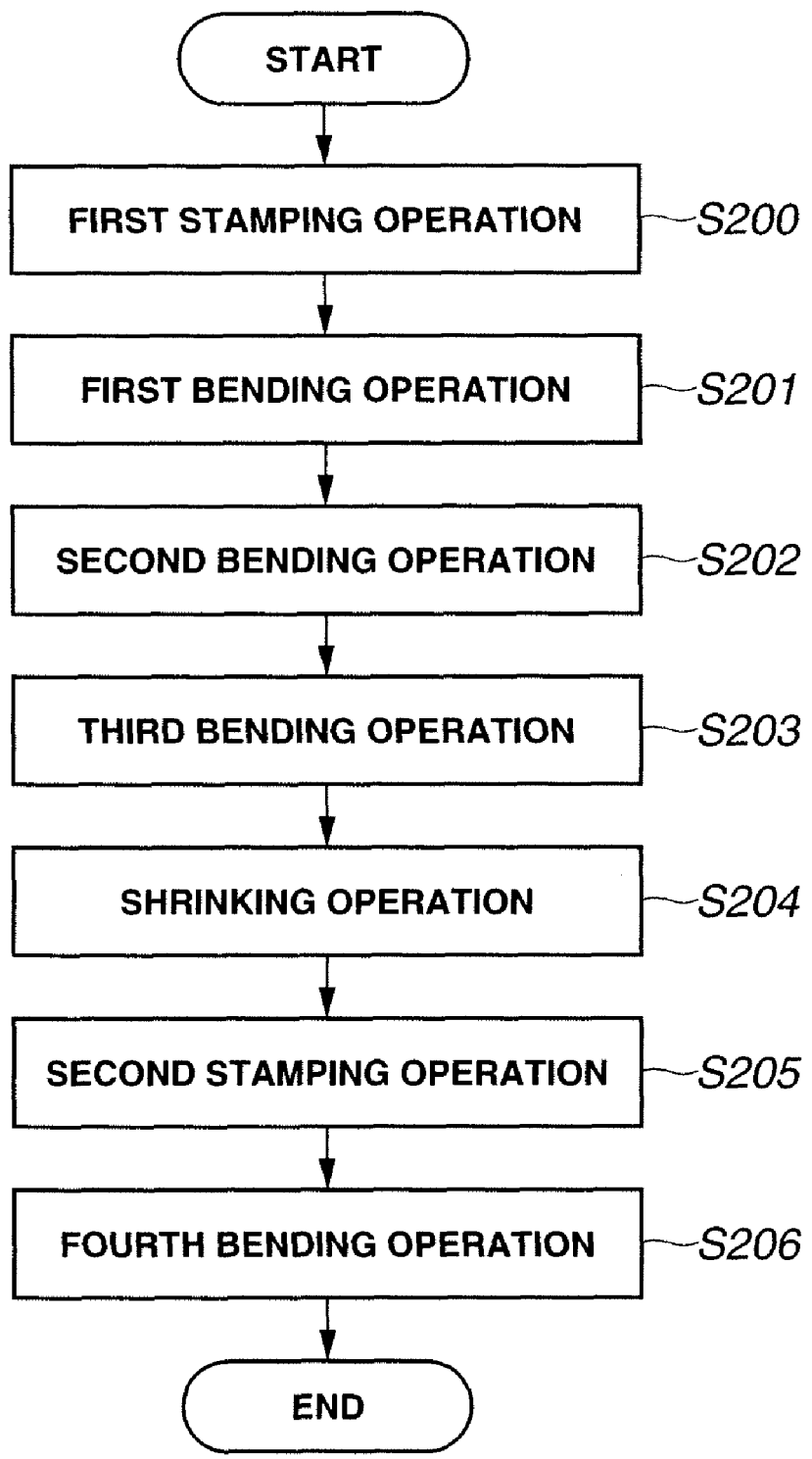
FIG. 9 is a flow chart showing a process of producing a blade structure according to a second embodiment of the present invention.
Figure 10:
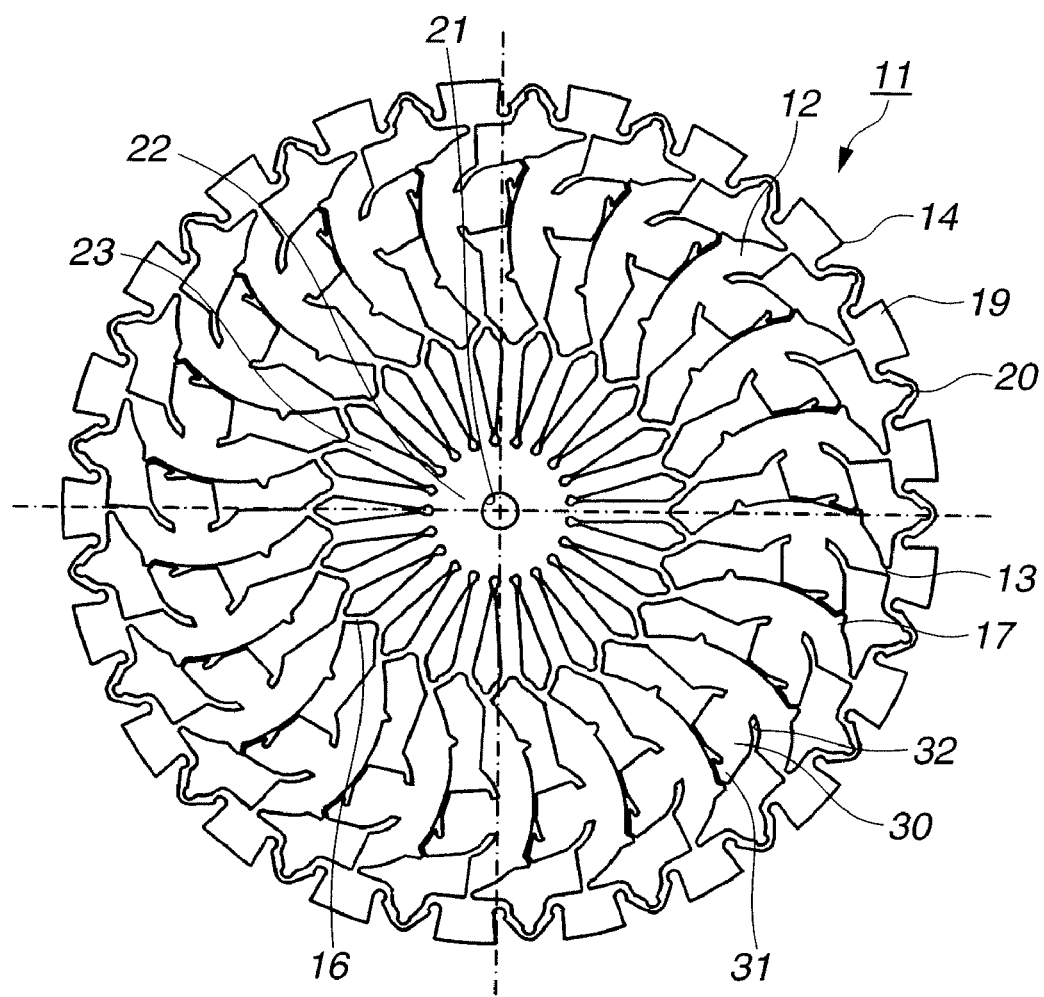
FIG. 10 is a plan view of a first form of the blade structure according to the second embodiment in the process of FIG. 9.

According to the flow chart of FIG. 9, first, at Step S200, a first stamping operation is performed. In this operation, a single flat thin metal plate or sheet is stamped by a stamping press into a first form of blade structure 11 which is a flat plate where first connecting section 14, second connecting section 16, and blades 12 are defined, as shown in FIG. 10. This operation is similar to the operation of Step S100 of the first embodiment, but the shape of the first form is different from that in the first embodiment.

As shown in FIG. 10, the first form includes central portion 22 defining the opening 21 at the center. The plurality of radial bridging portions 23 are arranged circumferentially around the central portion 22. Each radial bridging portion 23 is connected between central portion 22 and second connecting section 16.

In contrast to the first embodiment, each blade 12 according to the second embodiment is provided with a core element 30. Each core element 30 is connected to a circumferential edge of blade 12. Each core element 30 includes a hooking portion 31, and a notch 32. Each hooking portion 31 is formed at a circumferential end of core element 30, and arranged to project from a base portion of core element 30 in a circumferential direction, i.e. in the clockwise direction as viewed in FIG. 10. Each notch 32 is formed at a portion where core element 30 is connected to blade 12. As described in detail below, each hooking portion 31 is adapted to engage with notch 32 of adjacent core element 30, so as to join core elements 30 together to form the core section 40.

Figure 11:
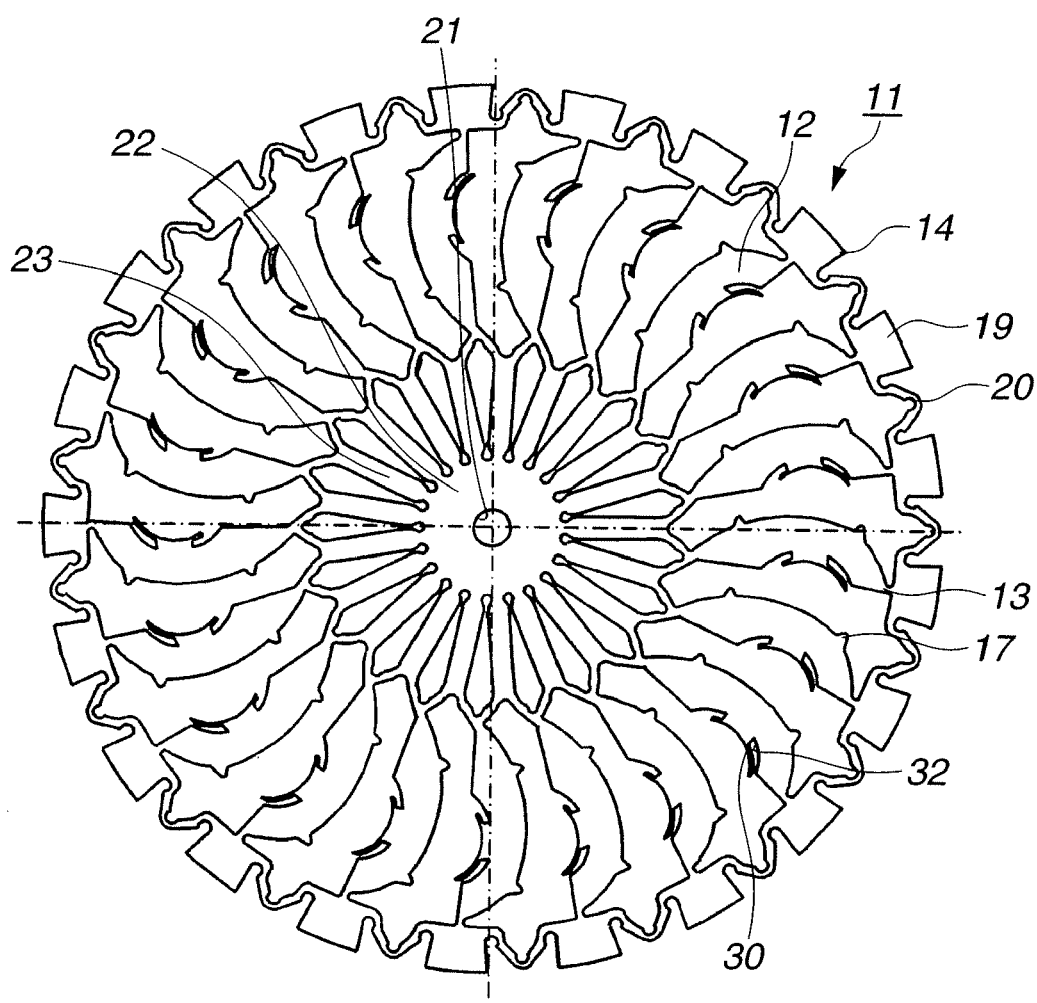
FIG. 11 is a plan view of a second form of the blade structure according to the second embodiment in the process of FIG. 9.

At Step S201, a first bending operation is performed. In this operation, the core elements 30 are deformed into a predetermined shape by pressing with a mold, as shown in FIG. 11. This operation defines a substantially final shape of each core element 30.

As shown in FIG. 11, each core element 30 is curved, and formed by press forming, so that core element 30 projects downwardly from the base plane of blade structure 11.

Figure 12:
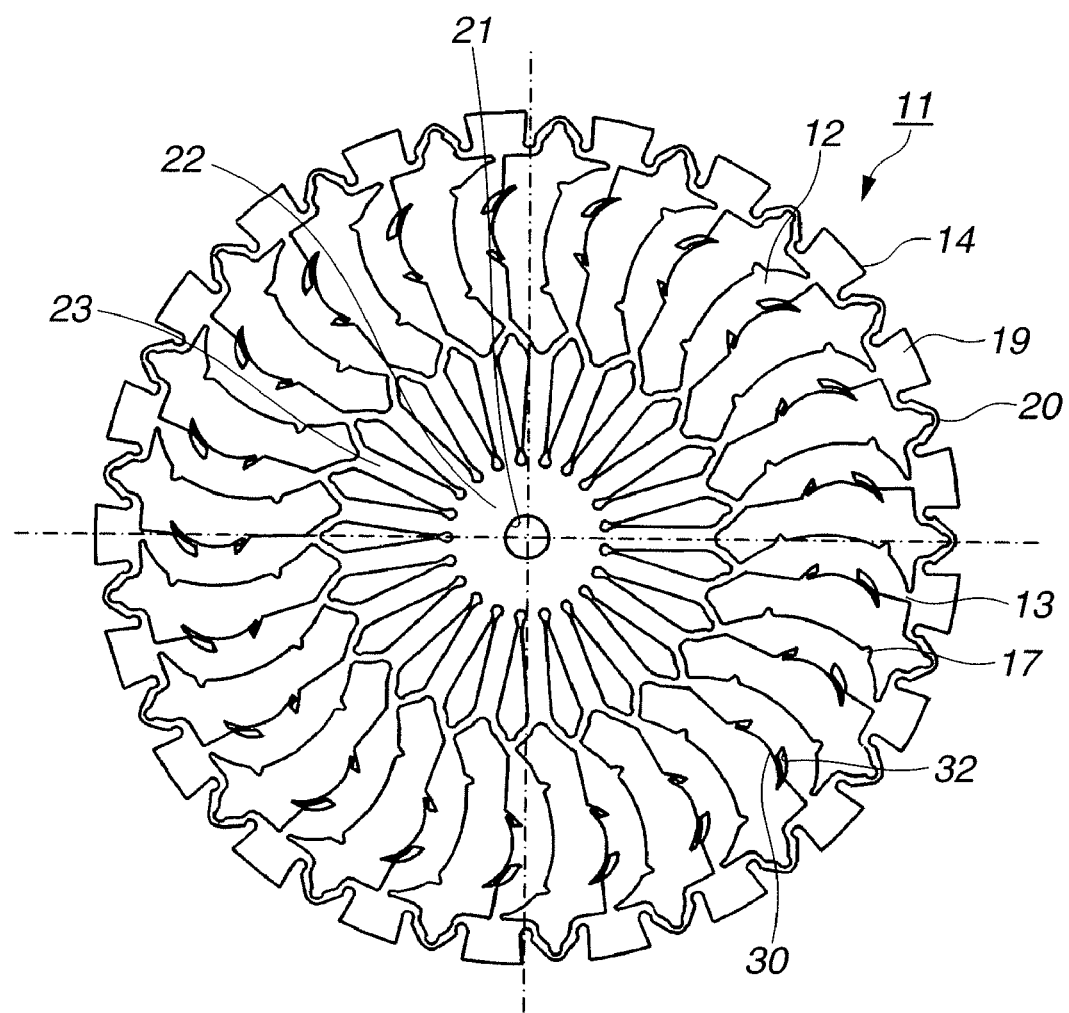
FIG. 12 is a plan view of a third form of the blade structure according to the second embodiment in the process of FIG. 9.

At Step S202, a second bending operation is performed. In this operation, blades 12 are pressed against a mold, and bended into a predetermined shapes as shown in FIG. 12. This operation is similar to the operation of Step S101 of the first embodiment. This operation defines a substantially final shape of each blade 12 when blade structure 11 is attached to turbine shell 10.

Figure 13:
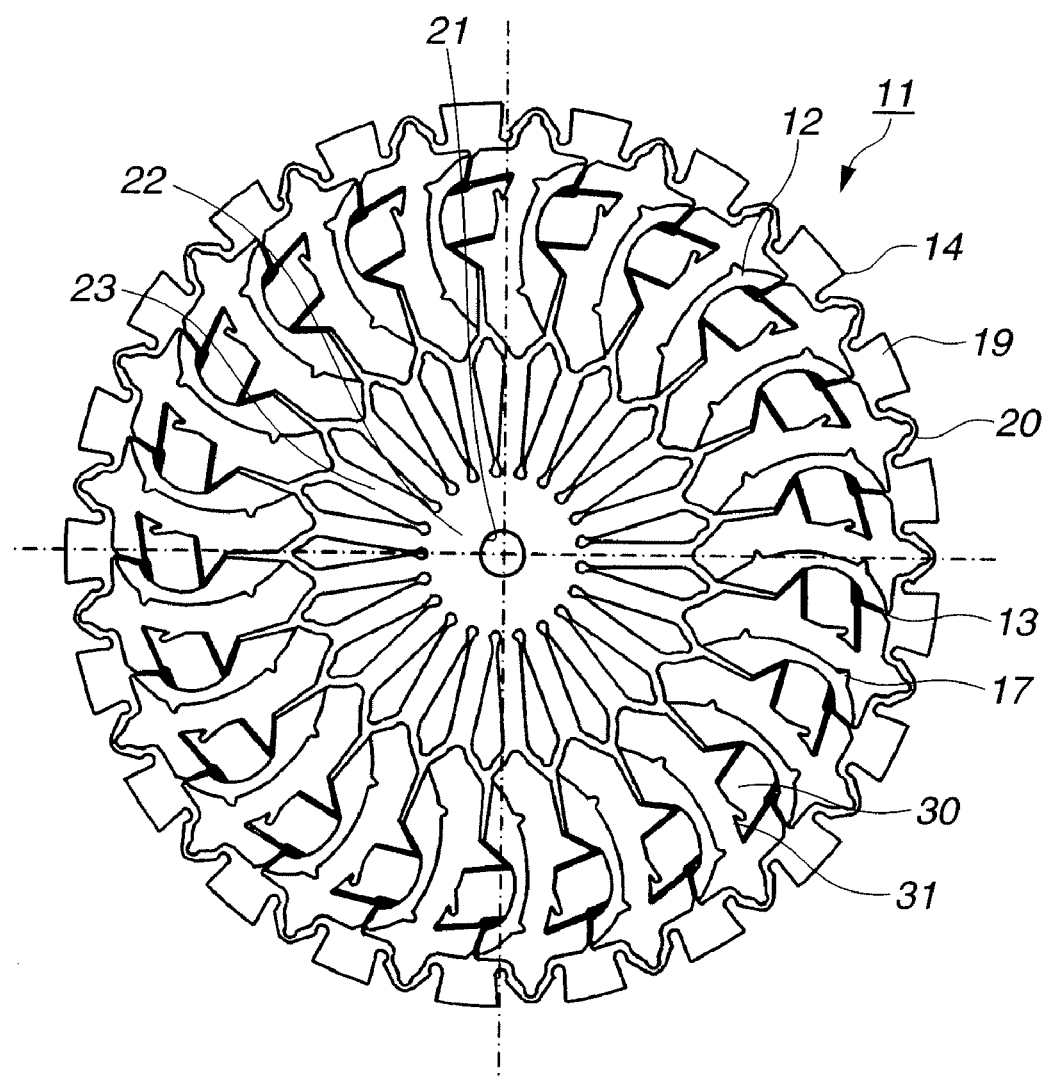
FIG. 13 is a plan view of a fourth form of the blade structure according to the second embodiment in the process of FIG. 9.

At Step S203, a third bending operation is performed. In this operation, blade structure 11 is pressed against a mold so as to rotate each curved blade 12 with respect to first connecting section 14 and second connecting section 16 as shown in FIG. 13. This operation is similar to the operation of Step S102 of the first embodiment. This operation defines a final angle of blade 12 relative to turbine shell 10 when blade structure 11 is attached to turbine shell 10.

Figure 14:
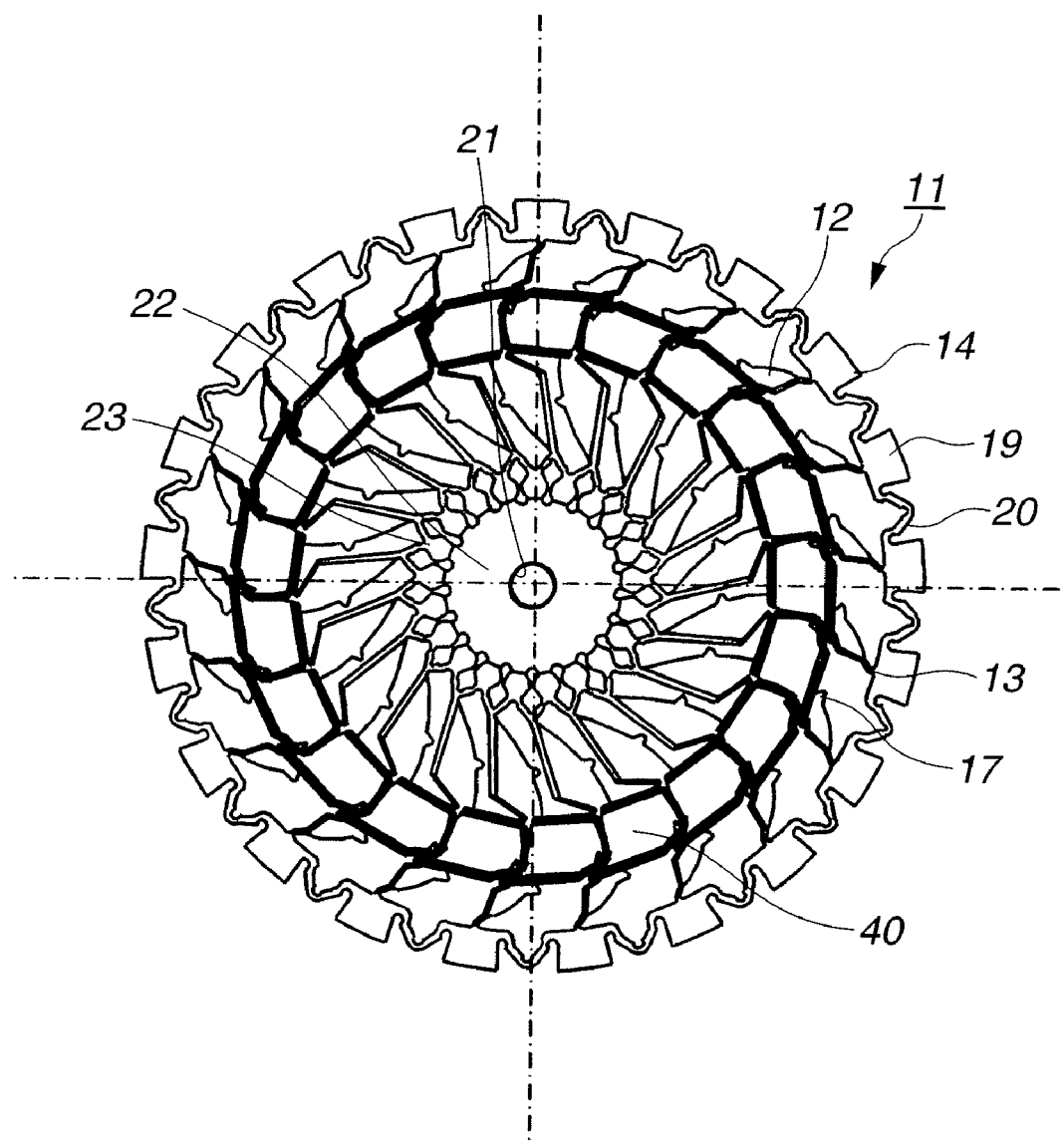
FIG. 14 is a plan view of a fifth form of the blade structure according to the second embodiment in the process of FIG. 9.

At Step S204, a shrinking operation is performed. In this operation, blade structure 11 is pressed against a mold so that radial bridging portions 23 are deformed to extend downwardly from the base plane of blade structure 11. This creates projection 24 as shown in FIG. 14.

The deformation of radial bridging portions 23 cause the blade structure 11 to shrink radially and circumferentially as in the operation of Step S103 of the first embodiment. In this shrinking operation, the outer diameter of blade structure 11 is set to a desired value, and each distance between two adjacent blades 12 is reduced and set to a desired value.

Moreover, as each distance between two adjacent blades 12 decreases, each distance between two adjacent core elements 30 decreases. The hooking portion 31 of core element 30 approaches and then engages with the notch 32 of the next core element 30. Core elements 30 are thus joined together to form the annular core section 40.

The shrinking operation of Step S204 may be implemented by an operation of pressing for suitably adjusting the outer diameter of blade structure 11 and each distance between two adjacent blades 12, and thereafter by an operation of pressing for engaging each core element 30 with the next core element 30.

At Step S205, a second stamping operation is performed. In this operation, the projection 24, which is created through the shrinking operation at Step S204, is cut away or removed from blade structure 11 by pressing or the like. The annular second connecting section 16 is left in blade structure 11. This operation is similar to the operation of Step S104 of the first embodiment.

At Step S206, a fourth bending operation is performed. In this operation, the blade structure 11 is pressed so as to allow first connecting section 14 and second connecting section 16 to be fit on the inclined inner wall of turbine shell 10. Then, the blade structure 11 is attached to turbine shell 10. This operation is similar to the operation of Step S105 of the first embodiment.

The thus-formed blade structure 11 is positioned with respect to turbine shell 10 by swaging the lugs 17 into the recesses of turbine shell 10, and fixedly attached to turbine shell 10 by brazing or welding.

Core elements 30, which are mutually engaged to constitute the core section 40, are integrated by brazing or welding.

In this way, blade structure 11, which is adapted to be easily mounted to turbine shell 10, is formed from a single flat thin metal sheet.

The following describes advantageous effects produced by the second embodiment except the advantageous effects produced by the first embodiment.

The integral formation of core section 40 and blade structure 11 eliminates an operation of attaching the core section 40 to blade structure 11, and thereby reduces the time needed to assemble torque converter 1. The provision of this core section 40 improves the strength and rigidity of blade structure 11, and thereby allows the blades 12 to be more easily positioned at the recesses of turbine shell 10.

Although blade structure 11 is attached to turbine shell 10 so as to form the turbine runner 5 in the present embodiments, the blade structure 11 may be adapted to be attached to an impeller shell so as to form the pump impeller 4.

Although first connecting section 14 includes base portions 19 and first adjusting portions 20 in the present embodiments, the first connecting section 14 may include first adjusting portions 20 and no base portions 19 as in the case of second connecting section 16. On the other hand, the second connecting section 16 may further include base portions each of which is connected between two adjacent second adjusting portions 18, as in the case of first connecting section 14.

This application is based on a prior Japanese Patent Application No. 2007-205425 filed on Aug. 7, 2007. The entire contents of this Japanese Patent Application No. 2007-205425 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A blade structure for a torque converter, produced according to a process comprising:
   (a) stamping a flat sheet into a shape including:
      a holding section;
      an inner connecting section located around the holding section, and held by the holding section;
      an outer connecting section located around the inner connecting section; and
      a plurality of blades connected between the inner connecting section and the outer connecting section;
   (b) bending the blades into a curved shape between the inner connecting section and the outer connecting section;
   (c) angling the blades by a predetermined angle with respect to the inner connecting section and the outer connecting section;
   (d) displacing the holding section with respect to the inner connecting section perpendicularly of the sheet so as to shrink the sheet toward the holding section and shrink spaces between the blades; and
   (e) removing the displaced holding section from the sheet, wherein:
   the outer connecting section includes:
      a plurality of first bridging portions connected to respective ones of the blades;
      a plurality of base portions connected to respective ones of the first bridging portions; and
      a plurality of first adjusting portions connected between respective two adjacent ones of the base portions; and
   each of the first adjusting portions is arranged to adjust a distance between respective two adjacent ones of the first bridging portions when the holding section is displaced with respect to the inner connecting section perpendicularly of the sheet.

2. The blade structure as claimed in claim 1, wherein each of the first adjusting portions is L-shaped, and projecting radially outwardly, as viewed perpendicularly of the sheet.

3. The blade structure as claimed in claim 1, wherein each of the first bridging portions is offset from a center of a respective one of the base portions in a direction opposite to a direction in which the curved shape of each of the blades is projecting as viewed perpendicularly of the sheet.

4. A blade structure for a torque converter, produced according to a process comprising:
   (a) stamping a flat sheet into a shape including:
      a holding section;
      an inner connecting section located around the holding section, and held by the holding section;
      an outer connecting section located around the inner connecting section; and
      a plurality of blades connected between the inner connecting section and the outer connecting section;
   (b) bending the blades into a curved shape between the inner connecting section and the outer connecting section;
   (c) angling the blades by a predetermined angle with respect to the inner connecting section and the outer connecting section;
   (d) displacing the holding section with respect to the inner connecting section perpendicularly of the sheet so as to shrink the sheet toward the holding section and shrink spaces between the blades; and
   (e) removing the displaced holding section from the sheet, wherein:
   the inner connecting section includes:
      a plurality of second bridging portions connected to respective ones of the blades; and
      a plurality of second adjusting portions connected between respective two adjacent ones of the second bridging portions; and
   each of the second adjusting portions is arranged to adjust a distance between the respective two adjacent ones of the second bridging portions when the holding section is displaced with respect to the inner connecting section perpendicularly of the sheet.

5. The blade structure as claimed in claim 4, wherein each of the second adjusting portions is L-shaped, and projecting radially inwardly, as viewed perpendicularly of the sheet.

6. The blade structure as claimed in claim 1, wherein the holding section includes:
   a central portion located at a center of the inner connecting section; and
   a plurality of bridging portions arranged circumferentially around the central portion at intervals of a predetermined clearance, each of the bridging portions having one end connected to the central portion and another end connected to the inner connecting section.

7. The blade structure as claimed in claim 6, wherein the central portion is in a form of an annular ring.

8. A blade structure for a torque converter, produced according to a process comprising:
   (a) stamping a flat sheet into a shape including:
      a holding section;
      an inner connecting section located around the holding section, and held by the holding section;
      an outer connecting section located around the inner connecting section;
      a plurality of blades connected between the inner connecting section and the outer connecting section; and
      a plurality of core elements projecting from respective ones of the blades;
   (b) angling the core elements by a first predetermined angle with respect to respective ones of the blades;
   (c) bending the blades into a curved shape between the inner connecting section and the outer connecting section;
   (d) angling the blades by a second predetermined angle with respect to the inner connecting section and the outer connecting section;

(e) displacing the holding section with respect to the inner connecting section perpendicularly of the sheet so as to shrink the sheet toward the holding section, shrink spaces between the blades and connect the core elements to respective two adjacent ones of the core elements; and (f) removing the displaced holding section from the sheet.

9. The blade structure as claimed in claim 8, wherein:

each of the core elements includes a notch at a first end connected to a respective one of the blades and a hooking portion at a second end opposite to the first end; and the hooking portion of each of the core elements is arranged to engage with the notch of an adjacent one of the core elements when the holding section is displaced with respect to the inner connecting section perpendicularly of the sheet.

10. The blade structure as claimed in claim 9, wherein the holding section includes:

a central portion located at a center of the inner connecting section; and a plurality of bridging portions arranged circumferentially around the central portion at intervals of a predetermined clearance, each of the bridging portions having one end connected to the central portion and another end connected to the inner connecting section.

11. The blade structure as claimed in claim 10, wherein the central portion is in a form of an annular ring.

12. The blade structure as claimed in claim 2, wherein each of the first bridging portions is offset from a center of a respective one of the base portions in a direction opposite to a direction in which the curved shape of each of the blades is projecting as viewed perpendicularly of the sheet.

\* \* \* \* \*